United States Patent
Besier et al.

(10) Patent No.: US 10,351,110 B2
(45) Date of Patent: Jul. 16, 2019

(54) BRAKE SYSTEM FOR MOTOR VEHICLES

(71) Applicant: Continental Teves AG & Co. oHG, Frankfurt (DE)

(72) Inventors: Marco Besier, Bad Schwalbach (DE); Stefan Drumm, Saulheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 31 days.

(21) Appl. No.: 15/352,302

(22) Filed: Nov. 15, 2016

(65) Prior Publication Data

US 2017/0072920 A1 Mar. 16, 2017

Related U.S. Application Data

(63) Continuation of application No. PCT/EP2015/060167, filed on May 8, 2015.

(30) Foreign Application Priority Data

May 15, 2014 (DE) ........................ 10 2014 209 270

(51) Int. Cl.
*B60T 7/22* (2006.01)
*B60T 8/32* (2006.01)
(Continued)

(52) U.S. Cl.
CPC ............... *B60T 7/22* (2013.01); *B60T 7/042* (2013.01); *B60T 8/321* (2013.01); *B60T 8/4081* (2013.01);
(Continued)

(58) Field of Classification Search
CPC .......... B60T 7/22; B60T 7/042; B60T 8/4081; B60T 8/321; B60T 2270/82; B60T 2270/413
See application file for complete search history.

(56) References Cited

U.S. PATENT DOCUMENTS

2006/0015231 A1* 1/2006 Yoshimura ............... B60K 6/46
701/48
2010/0241330 A1* 9/2010 Hartmann ............... B60T 8/267
701/70
2017/0267221 A1* 9/2017 Hecker ................... B60T 8/885

FOREIGN PATENT DOCUMENTS

DE 102007001371 A1 7/2008
DE 102009046234 A1 5/2011
(Continued)

OTHER PUBLICATIONS

International Search Report and Written Opinion dated Jul. 28, 2015 from corresponding International Patent Application No. PCT/EP2015/060167.
(Continued)

*Primary Examiner* — Nadeem Odeh
*Assistant Examiner* — Michael V Kerrigan

(57) ABSTRACT

A brake system for motor vehicles controllable by a driver or independently of the driver, comprises first and second brake actuation sensors. First and second electrically controllable pressure sources, can actuate the wheel brakes. A first electronic control unit controls the first pressure source, and is connected to the first brake actuation sensor. A second electronic control unit controls the second pressure source and is connected to the second brake actuation sensor. A hydraulic control device comprises a first solenoid valve between the wheel brakes and the first pressure source and a second solenoid valve between the wheel brakes and the second pressure source. There is a data connection between the first electronic control unit and the second electronic control unit. The first electronic control unit has a first interface and the second electronic control unit has a second interface that are not connected to each other.

19 Claims, 2 Drawing Sheets

(51) Int. Cl.
*B60T 8/40* (2006.01)
*B60T 7/04* (2006.01)

(52) U.S. Cl.
CPC ..... *B60T 2270/413* (2013.01); *B60T 2270/82* (2013.01)

(56) References Cited

FOREIGN PATENT DOCUMENTS

| DE | 102011108297 A1 | 8/2012 |
| DE | 102013017688 A1 | 4/2014 |
| DE | 102013224870 A1 | 9/2014 |
| WO | WO9849038 A1 | 11/1998 |
| WO | WO0068056 A1 | 11/2000 |
| WO | WO2012049134 A1 | 4/2012 |
| WO | WO2012150120 A1 | 11/2012 |
| WO | WO2014016601 A1 | 1/2014 |

OTHER PUBLICATIONS

German Search Report dated Dec. 22, 2015 for corresponding German Patent Application No. 10 2015 206 572.3.

\* cited by examiner

BRAKE SYSTEM FOR MOTOR VEHICLES

CROSS-REFERENCE TO RELATED APPLICATION

This disclosure claims priority to PCT Application No. PCT/EP2015/060167, which was filed on May 8, 2015 and is incorporated herein by reference.

TECHNICAL FIELD

The invention concerns a brake system for motor vehicles.

BACKGROUND

Hydraulic vehicle brake systems are known that are in the form of external force brake systems and that comprise, besides a muscle power operated master brake cylinder, to which wheel brakes are hydraulically connected and that provide the pressure and volume for actuating wheel brakes, a further, electrically controllable pressure and volume providing device, which activates the wheel brakes in a "brake-by-wire" operating mode. In the event of failure of the electrically controllable pressure and volume providing device, operation of the wheel brakes is carried out solely by the muscle power of the driver of the vehicle.

Thus, for example, an electrohydraulic brake system with a brake pedal operated master brake cylinder, a travel simulator and an electrically controllable pressure providing device are known from WO 2011/029812 A1. The wheel brakes are subjected to pressure by the pressure providing device in a "brake-by-wire" operating mode. In a fallback mode, the wheel brakes are subjected to the pressure applied by the driver by means of the master brake cylinder that is operated by the brake pedal. It has proved disadvantageous with the brake system that in the event of a failure of the actuation or the drive of the pressure providing device, operation of the wheel brakes is only possible by the driver.

An electrohydraulic "brake-by-wire" brake system with a brake pedal actuated master brake cylinder, a first electrically controllable pressure providing device and a second electrically controllable pressure providing device are therefore described in WO 2012/150120 A1.

A pressure and volume boost of the brake pedal operation that is applied by the driver of the vehicle can be carried out by means of the second pressure providing device if the first pressure providing device fails.

Motor vehicles are to an increasing extent fitted with an environment sensor system, using which an environment control unit can determine a target trajectory for the vehicle and can actuate the drive, brake system and steering of the vehicle independently of the driver. The object thereof is automated driving, during which the vehicle is automatically maneuvered independently of the steering, drive or braking demands of the driver. During this an increase in operating safety, in particular of the brake system, is necessary even in the event of faults.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is therefore the object of the present invention to provide a brake system that is suitable for automated driving and in particular meets the safety requirements that are necessary for this regarding the availability of the brake function, even in the event of a fault, such as a defect of the electrically controllable pressure source or a broken electrical connection.

One embodiment of the invention is based on the idea of providing at least two independent working paths for externally actuated braking, in particular on request by an environment control unit. For this purpose, the working paths are each provided with a sensor system for detecting a brake operation, an electrically controllable pressure source, an electronic control unit as well as an interface for requesting externally actuated braking, wherein the interface of the first electronic control unit and the interface of the second electronic control unit are not connected to each other, i.e. are independent. The first electronic control unit is however additionally connected to the second electronic control unit by means of a further data connection.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
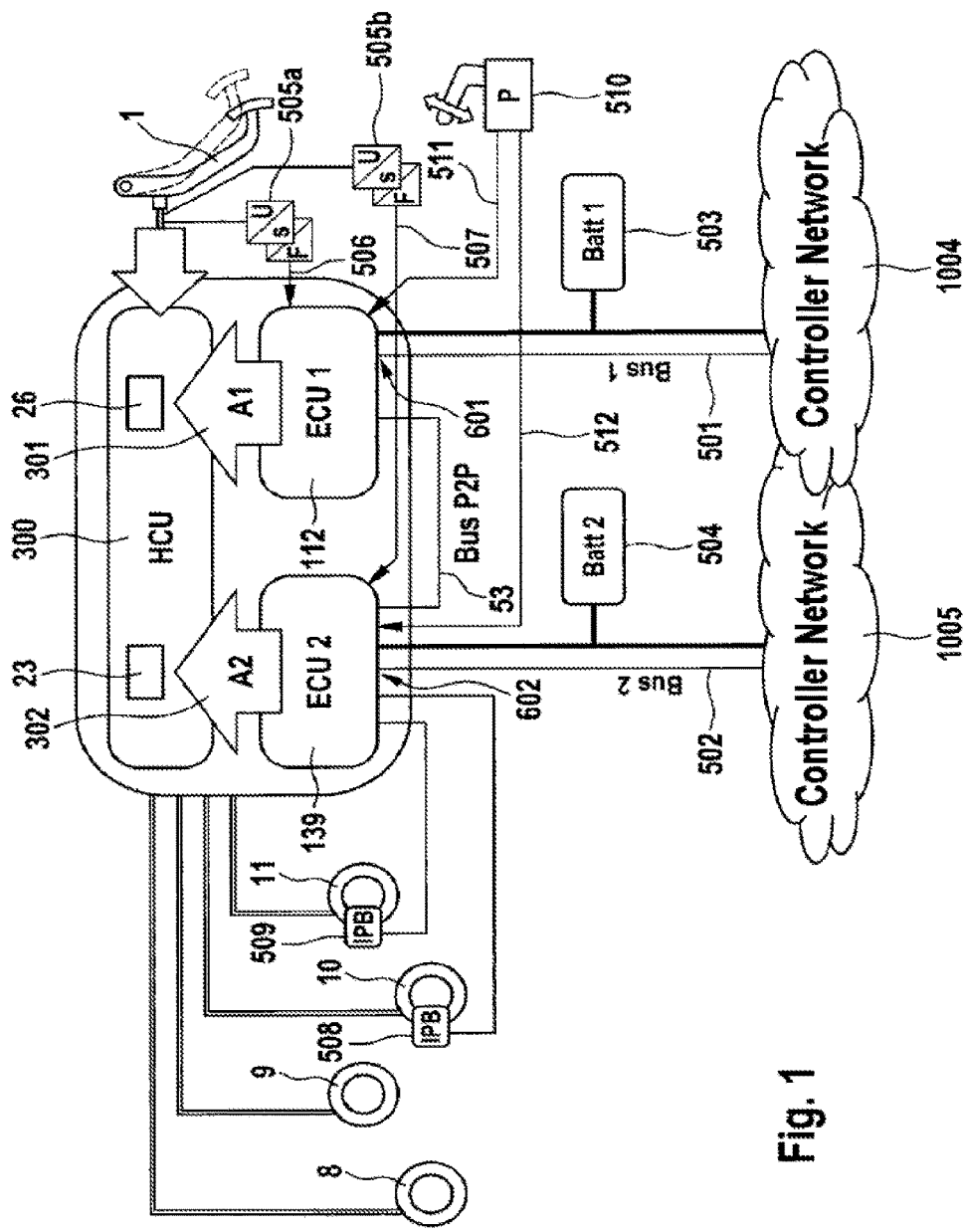
FIG. 1 shows schematically a first exemplary embodiment of a brake system according to the invention.

The brake system according to a first exemplary embodiment of the invention shown in FIG. 1 comprises four hydraulically operated wheel brakes 8, 9, 10, 11, which are preferably disposed in at least two brake circuits. The driver can cause braking by means of the brake pedal 1. The operation of the brake is detected by at least two independent brake operation sensors 505a and 505b, which are advantageously each implemented redundantly. According to the example, the brake operation sensors 505a, 505b detect the operating force or the operating travel of the brake pedal 1.

The brake system according to the example comprises a hydraulic control device in the form of a hydraulic control unit (HCU) 300, to which a first electrically controllable pressure source (A1) 301 and a second electrically controllable pressure source (A2) 302 are connected. The pressure sources 301 and 302 can also be part of the hydraulic control unit 300, i.e. integrated within the same. The pressure sources 301, 302 can cause a build-up of brake pressure in the wheel brakes 8-11 independently of each other.

In order to be able to selectively isolate the wheel brakes 8-11 from or connect the wheel brakes 8-11 to one of the pressure sources 301, 302, the hydraulic control device 300 preferably comprises at least one first electrically operated valve 26, in particular a solenoid valve, between the wheel brakes 8-11 and the first pressure source 301 as well as a second electrically operated valve 23, in particular a solenoid valve, between the wheel brakes 8-11 and the second pressure source 302, which is indicated schematically in FIG. 1.

The first pressure source 301 is actuated by a first electronic control unit (ECU1) 112, whereas the second pressure source 302 is actuated by a second electronic control unit (ECU2) 139.

The first brake operation sensor 505a is connected to the first control unit 112 by means of a signal or data line 506 and the second brake operation sensor 505b is connected to the second control unit 139 by means of a signal or data line 507.

At least two, advantageously mutually independent, electrical energy sources 503, 504 are provided, according to the example in the form of batteries, for supplying the brake system with electrical energy. In this case the first electronic control unit 112 is connected to the first energy source (Batt1) 503 and the second electronic control unit 139 is connected to the second energy source (Batt2) 504. The energy supply can be independent on-board networks consisting of energy storage devices (such as batteries) and generators (such as alternators).

In order to enable actuation of the brake system during automated driving by an environment control unit with an autopilot function, the brake system is connected by means of at least two independent communications connections 501, 502 or data buses (first data bus 501: Bus 1, second data bus 502: Bus 2) to the environment control unit or to a controller network in which a number of control units—also including the environment control unit—are incorporated. The control units can exchange information by means of the controller network.

Here the first electronic control unit 112 according to the example is connected by means of a first interface 601 and the first data bus 501 to a first number 1004 of control units comprising a (first) environment control unit with an autopilot function.

The second electronic control unit 139 is connected by means of a second interface 602 and the second data bus 502 to a second number 1005 of control units, which also comprises the (first) environment control unit, i.e. the first data bus 501 and the second data bus 502 are connected to two independent interfaces of the same environment control unit (first and second interfaces of the (first) environment control unit).

Alternatively, the second electronic control unit 139 is connected by means of a second interface 602 and the second data bus 502 to a second number 1004 of control units that comprises a further (second) environment control unit with an autopilot function.

In both cases, each of the control units 112, 139 is separately connected by means of an interface or communications line to an "autopilot" or a controller network.

The first and/or the second environment control unit can each also be formed by a group of control units, which together or jointly constitute the "autopilot function", i.e. can request externally actuated braking.

In the respective environment control unit, for example a target trajectory for the vehicle is determined and the drive, the brake system as well as the steering of the vehicle are actuated accordingly, independently of the driver.

Furthermore, a communications connection 53 or a third data bus (Bus P2P) is provided between the electronic control units 112 and 139, by means of which the electronic control units 112, 139 can exchange information and/or requests with each other.

The communications connection 53 between the electronic control units 112 and 139 in combination with the independent connections of the first and second electronic control units to the (first) environment control unit or the environment control units (first and second environment control units) by means of the independent interfaces 601 and 602 gives the advantage of two independent request paths for externally actuated braking. Thus, for example, in the event of a failure of the first communications connection 501 the first electronic control units 112 can still be actuated by an environment control unit by means of the "detour" of the second communications connection 502 and the third communications connection 53 (with the aforementioned exemplary embodiments, in the first case by means of the second interface of the first environment control unit and in the second case by means of the (first) interface of the second environment control unit). Accordingly, in the case of a failure of the second communications connection 502, the second electronic control unit 139 can be actuated by an environment control unit by means of the "detour" of the first communications connection 501 and the third communications connection 53 (i.e. in addition to the actuation of the first electronic control units 112 by means of the "direct path"" of the first communications connection 501). With the aforementioned exemplary embodiments, in the first and second cases this would be actuation of the second electronic control unit 139 by means of the first interface of the first environment control unit.

If one of the components the first energy source 503, the first electronic control unit 112 or the first pressure source 301 should not be operational, the electronic autopilot can cause braking by means of the components the second energy source 504, the second electronic control unit 139 and the second pressure source 249. And vice-versa, if one of the components the second energy source 504, the second electronic control unit 139 or the second pressure source 249 would not be operational, the electronic autopilot can cause braking by means of the components the first energy source 503, the first electronic control unit 112 and the first pressure source 301.

The brake system further comprises an electrical parking brake that comprises a first electrically operated actuator 508 and a second electrically operated actuator 509. According to the example, the actuators 508, 509 of the electrical parking brake are associated with the wheel brakes 10 and 11. The driver can operate the electrical parking brake by means of a parking brake operating switch 510. The parking brake operating switch 510 is connected to the first control unit 112 by means of a first signal or data connection 511 and is connected to the second control unit 139 by means of a second signal or data connection 512 that is independent of the first signal or data connection.

Advantageously, the electrical parking brake is or the actuators 508, 509 are connected to the second electronic control unit 139 by means of signal or data connections that are not indicated in detail, so that the electrical parking brake or the actuators 508, 509 can be actuated by the second electronic control unit 139.

Figure 2:
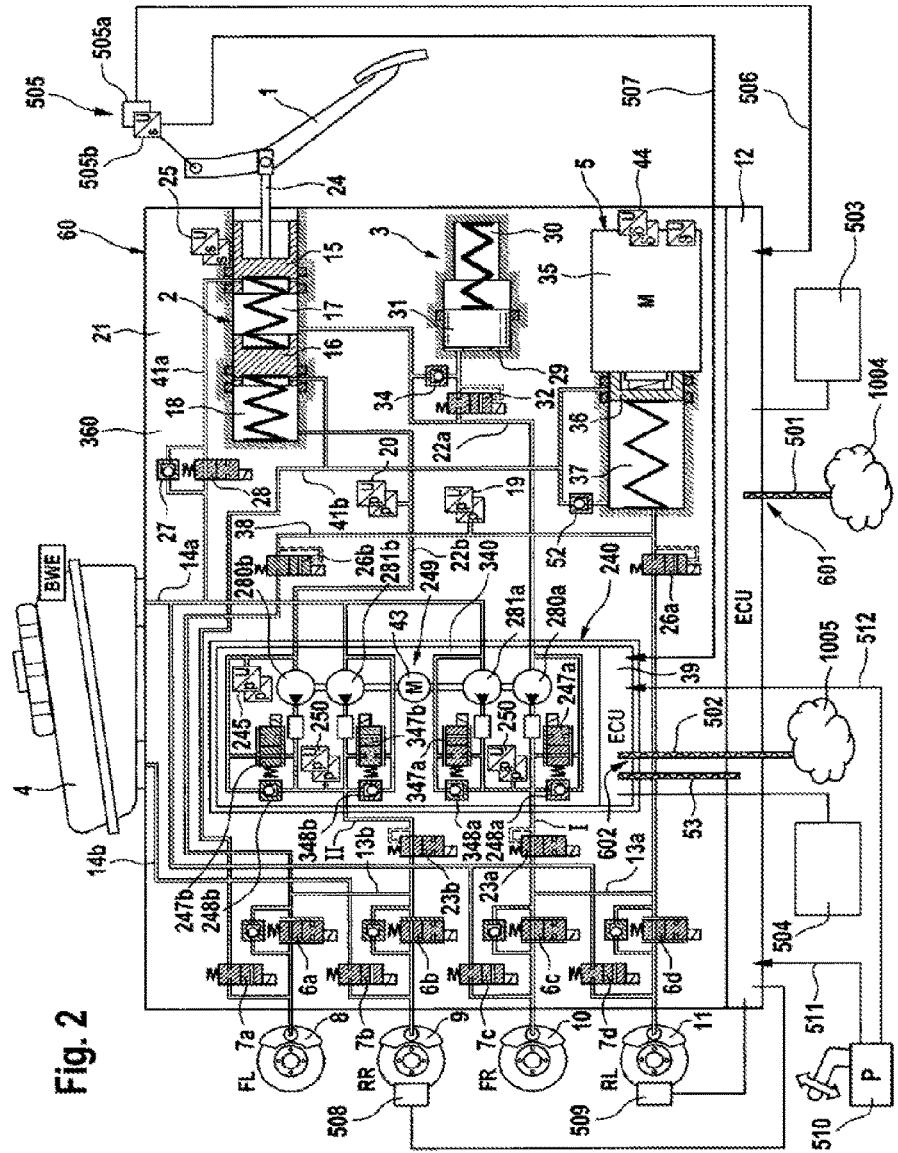
FIG. 2 shows schematically a second exemplary embodiment of a brake system according to the invention.

A second exemplary embodiment of a brake system according to the invention is represented in FIG. 2. According to the example, the brake system comprises a master brake cylinder 2 that is operated by means of an operating or brake pedal 1 and that is reversibly connected to hydraulically operated wheel brakes 8, 9, 10, 11, a simulator (travel simulator) 3 working in conjunction with the master brake cylinder 2, a pressure medium reservoir container 4 under atmospheric pressure that is associated with the master brake cylinder 2, a first electrically controllable pressure source 5 that can or does supply the wheel brakes with brake pressure, a second electrically controllable pressure source 249 that can or does supply the wheel brakes with brake pressure, a first electronic control and a regulating unit 12 for actuating the first pressure source 5 and a second electronic control and regulating unit 39 for actuating the second pressure source 249.

The brake pedal 1 is provided with a redundant brake operation sensor device 505, the one brake operation sensor 505*a* of which is connected to the first electronic control and regulating unit 12 by means of the data line 506 and the other brake operation sensor 505*b* of which is connected to the second electronic control and regulating unit 39 by means of a data line 507.

For the exchange of information and/or requests with each other, the electronic control and regulating units 12 and 39 are connected to each other by means of a communications connection 53 or a third data bus.

The first electronic control and regulating unit 12 is supplied by a first electrical energy source 503 and the second electronic control and regulating unit 39 is supplied by a second electrical energy source 504.

The brake system is connected by means of a first interface 601 to the first electronic control and regulating unit 12 by a first data bus 501, and moreover to a number 1004 of control units comprising a (first) environment control unit with an autopilot function. The second electronic control and regulating unit 39 comprises a second interface 602 that is independent of the first. The brake system is connected to a second data bus 502, and moreover to a number 1005 of control units, by means of the second interface 602.

According to the example, the number 1005 of control units comprises the first environment control unit with an autopilot function, wherein the first interface 601 or the first data bus 501 is connected to a first interface of the first environment control unit and the second interface 602 or the second data bus 502 is connected to a second interface of the first environment control unit.

According to another exemplary embodiment, the number 1005 of control units comprises a second environment control unit with an autopilot function, so that the first interface 601 or the first data bus 501 is connected to an interface of the first environment control unit and the second interface 602 or the second data bus 502 is connected to an interface of the second environment control unit.

In both cases, each of the control units 12, 39 is connected separately to an "autopilot" or a controller network by means of an interface or communications line.

The first environment control unit or possibly the second environment control unit can each also be formed by a group of control units, which together or jointly constitute the "autopilot function", i.e. can request externally actuated braking.

According to the example, the master brake cylinder 2, the simulator 3 and the first electrically controllable pressure source 5 are disposed in a first hydraulic control unit (HCU) 360. The second electrically controllable pressure source 249 is disposed in a second hydraulic control unit (HCU) 260. The hydraulic components of the brake system are thus distributed between a first hydraulic control unit 360 and a second hydraulic control unit 340, which, as explained more accurately below, are hydraulically connected to each other and together constitute a hydraulic control device 300 of the brake system.

In this case the first hydraulic control unit 360 and the first electronic control and regulating unit 12 form a first electrohydraulic module 60 as well as the second hydraulic control unit 340 and the second electronic control and regulating unit 39 form a second electrohydraulic module 240.

The master brake cylinder 2 comprises two pistons 15, 16 that are disposed one after the other in a housing 21 and that bound the hydraulic pressure chambers 17, 18. The pressure chambers 17, 18 are connected on one side to the pressure medium reservoir container 4 (by means of the recirculation lines 14*a*, 14*b*) by means of radial bores formed in the piston 15, 16 as well as corresponding pressure equalization lines 41*a*, 41*b*, wherein said connection can be blocked by a relative displacement of the piston 17, 18 in the housing 21, and on the other side to so-called brake circuit supply lines 13*a*, 13*b* by means of hydraulic lines 22*a*, 22*b* (and the second pressure source 249). In this case, a parallel circuit of a normally open diagnostic valve 28 with a non-return valve 27 that closes towards the pressure medium reservoir container 4 is contained in the pressure equalization line 41*a*. The pressure chambers 17, 18 accommodate restoring springs that are not indicated in detail and that position the pistons 15, 16 in an initial position when the master brake cylinder 2 is not operated. A piston rod 24 couples the pivotal motion of the brake pedal 1 resulting from a pedal operation to the translational displacement of the first (master cylinder) piston 15. As a result, the corresponding piston travel signal is a measure of the brake pedal operation angle. It represents a braking intention of the driver. According to the example, the operating travel of the piston 15 is therefore detected by a preferably redundantly implemented travel sensor 25, which can also be used as a first or second brake operation sensor (i.e. instead of a sensor 505*a* or 505*b*) or as a third brake operation sensor for a third electronic control unit that is provided.

A pressure sensor 20 connected to the line segment 22*b* detects the pressure built up in the pressure chamber 18 by displacement of the second piston 16. The pressure sensor 20 can be used as a first or second brake operation sensor (i.e. instead of a sensor 505*a* or 505*b*) or as a third brake operation sensor for a third electronic control unit that is provided.

An isolating valve 23*a*, 23*b*, which is in the form of an electrically operated, preferably normally open, 2/2-way valve in each case, is disposed in each hydraulic connection between a pressure chamber 17, 18 and the associated brake circuit supply line 13*a*, 13*b*. The hydraulic connection between the pressure chambers 17, 18 and the brake circuit supply lines 13*a*, 13*b* can be blocked by the isolating valves 23*a*, 23*b*.

The travel simulator 3 is hydraulically coupled to the master brake cylinder 2 and comprises according to the example a simulator chamber 29, a simulator spring chamber 30 as well as a simulator piston 31 isolating the two chambers 29, 30 from each other. The simulator piston 31 is supported on the housing 21 by an elastic element (for example a spring), which is disposed in the simulator spring chamber 30 and is advantageously pretensioned. The simulator chamber 29 can be connected to the first pressure chamber 17 of the tandem master brake cylinder 2 by means of an electrically operated simulator release valve 32. When a pedal force is set and the simulator release valve 32 is actuated, pressure medium flows from the master brake cylinder pressure chamber 17 into the simulator chamber 29. A non-return valve 34 that is disposed hydraulically antiparallel to the simulator release valve 32 enables a substantially unhindered return flow of the pressure medium from the simulator chamber 29 to the master brake cylinder pressure chamber 17 independently of the switching state of the simulator release valve 32.

According to the example, the first electrically controllable pressure source 5 is in the form of a hydraulic cylinder-piston arrangement or a single circuit electrohydraulic actuator, the piston 36 of which can be operated by a schematically indicated electric motor 35 with the interposition of a likewise schematically represented rotation-translation gearbox. A rotor position sensor for detecting the rotor position of the electric motor 35, which is only indicated schematically, is denoted by the reference character 44. In addition, a temperature sensor can also be used for sensing the temperature of the motor winding. The piston 36 bounds a pressure chamber 37.

The actuator pressure produced by the action of the force of the piston 36 on the pressure medium enclosed in the pressure chamber 37 is fed into a system pressure line 38. A preferably redundantly implemented pressure sensor 19 is provided for detecting the pressure occurring in the system pressure line 38. In a "brake-by-wire" operating mode of the brake system, the system pressure line 38 is connected to the brake circuit supply lines 13a, 13b by means of respective connecting valves 26a, 26b. A build-up and decrease of the wheel brake pressure takes place in this way for all wheel brakes 8, 9, 10, 11 during normal braking.

During the pressure decrease in this case, the pressure medium previously displaced from the pressure chamber 37 of the actuator 5 into the wheel brakes 8, 9, 10, 11 flows back on the same path into the pressure chamber 37 of the actuator 5. By contrast, when braking with different individual wheel brake pressures regulated using inlet and outlet valves 6a-6d, 7a-7d, the part of the pressure medium that is discharged via the outlet valves 7a-7d flows into the pressure medium reservoir container 4. Returning pressure medium into the pressure chamber 37 by suction is possible by returning the piston 36 with the connecting valves closed 26a, 26b, allowing pressure medium to flow out of the container 4 and into the pressure chamber 37 via a non-return valve 52 that opens in the flow direction to the first pressure source 5.

Furthermore, the first hydraulic control unit 360 comprises a pressure modulation device that is not described in detail and that according to the example comprises an inlet valve 6a-6d and an outlet valve 7a-7d per wheel brake 8, 9, 10, 11 that are hydraulically connected in pairs by means of central connections and are connected to the wheel brakes 8, 9, 10, 11.

The input ports of the inlet valves 6a-6d are supplied by means of the brake circuit supply lines 13a, 13b with pressures that, in the "brake-by-wire" operating mode, are derived from a system pressure that is present in the system pressure line 38 connected to the pressure chamber 37 of the first pressure source 5. A non-return valve that is not described in detail and that opens towards the brake circuit supply lines 13a, 13b is connected in parallel with each inlet valve 6a-6d. In an unboosted fallback mode, the brake circuit supply lines 13a, 13b are subjected by means of the hydraulic lines 22a, 22b to the pressures of the pressure chambers 17, 18 of the master brake cylinder 2. The output ports of the outlet valves 7c, 7d; 7a, 7b are connected to the pressure medium reservoir container 4 in pairs by means of the return lines 14a, 14b.

According to the example, the wheel brakes 8 and 9 of the brake circuit II (brake circuit supply lines 13b) are associated with the left front wheel FL and the right rear wheel RR and the wheel brakes 10 and 11 of brake circuit I (brake circuit supply lines 13a) are associated with the right front wheel FR and the left rear wheel RL. Other circuit distributions are also conceivable.

According to the example, said components 2, 3, 5, 6a-6d, 7a-7d, 12, 19, 20, 22a, 22b, 23a, 23b, 25, 26a, 26b, 27, 28, 32, 34, 38, 41a, 41b, 44, 46, 52 are contained together in an electrohydraulic module 60. The first electronic control and regulating unit 12 is used for actuation of the electrically operated components of the first hydraulic control unit 360 of the module 60, in particular the isolating valves 23a, 23b, the connecting valves 26a, 26b, the valves 28, 32 and the electric motor 35 of the first pressure source 5. The control and regulating unit 12 is also configured for the actuation of the pressure modulation device (inlet and outlet valves 6a-6d, 7a-7d). The signals of the sensors 19, 20, 25 and 44 are also processed in the first electronic control and regulating unit 12.

The second electrohydraulic module 240 comprises the second hydraulic control unit 340 with the second electrically controllable pressure source 249 and the second electronic control and regulating unit 39.

According to the example, the pressure source 249 is in the form of a four circuit pump driven by an electric motor 43, for example a 4-piston pump. In this case, for each brake circuit I, II a pump circuit 280a, 280b is disposed between the associated master brake cylinder pressure chamber 17, 18 and the corresponding isolating valve 23a, 23b. A further pump circuit 281a, 281b is disposed between the pressure medium reservoir container 4 and the corresponding isolating valve 23a, 23b. The suction sides of the two pump circuits 280a, 280b are each directly connected to the pressure chamber 17, 18 of the master brake cylinder (via the lines 22a or 22b), the suction sides of the two pump circuits 281a, 281b are connected via a common connecting line directly to the pressure medium reservoir container 4 (according to the example via the return line 14a). The pressure sides of the pump circuits 280a, 281a; 280b, 281b of the respective brake circuit (I, II) are each connected in common to the input port of the associated isolating valve 23a, 23b.

A second pressure source with a six circuit pump driven by an electric motor 43 is also conceivable. It is also possible that the second pressure source is in the form of a two circuit pump. The two pump circuits can then be disposed between the associated master brake cylinder pressure chamber and the corresponding isolating valve (corresponding to the pump circuits 280a, 280b). Alternatively, the two pump circuits can be disposed between the pressure medium reservoir container and the corresponding isolating valve. Other types of pressure source are also conceivable, wherein advantageously at least one dedicated brake circuit is provided for each brake circuit.

According to the example, for each pump circuit 280a, 280b the second hydraulic control unit 340 comprises an advantageously analog actuated regulating valve 247a, 247b that is connected in parallel with the pump and that is in particular implemented as normally open, and a non-return valve 248a, 248b opening in the direction of the wheel brakes 8, 9, 10, 11 and connected in parallel with the regulating valve 247a, 247b. In each pump circuit 281a, 281b an advantageously analog actuated overflow valve 248a, 248b, which is in particular implemented as normally closed, is connected in parallel with the pump, wherein each overflow valve 248a, 248b is connected in parallel with a non-return valve 348a, 348b that opens in the direction of the wheel brakes 8, 9, 10, 11. By means of the valves 247a, 247b, 248a, 248b, a volumetric flow from the pressure side of the pump to the suction side of the pump can be adjusted. The driver's pressure (the pedal force) is adjusted by means of the regulating valves 247a, 247b that are connected to the master brake cylinder 2 and the pressure in the two brake circuits I, II is adjusted independently of the driver by means of the overflow valves 248a, 248b.

According to the example, module 240 comprises a pressure sensor 245 disposed on the suction side of the pump circuit 280b as well as a pressure sensor 250 for each brake circuit I, II disposed on the pressure side of the pump circuits. Advantageously, the signals of the pressure sensors 245, 250 are fed to the control and regulating unit 39, which actuates the electric motor 43 and the valves 247a, 247b, 248a, 248b of the module 240.

In the event of a failure of the first pressure source 5 or of the first module 60, the second pressure source 249 or the second module 240 enables the provision or boosting of a brake system pressure, whereby the availability of the brake system is improved.

Because according to the second exemplary embodiment the module 240 is disposed hydraulically upstream of the isolating valves 23a, 23b, in the event of leakage in one of the connecting lines of the module 240, the affected operating circuit (i.e. the part of the brake circuit upstream of the isolating valve 23a or 23b with the leakage) can be separated by closing the associated isolating valve, so that the part of the brake circuit for building up pressure by means of the first pressure source 5 is not affected. A further advantage of the arrangement upstream of the isolating valves or of the direct connection of the suction sides of the pump circuits to the master brake cylinder pressure chamber or to the pressure medium reservoir container is that an increased pump volumetric flow is achieved by the elimination of suction throttling. In principle, a different arrangement of the module 240, for example between the isolating valves and the inlet valves, is also conceivable.

The brake system according to the example further comprises an electrical parking brake, the actuators 508, 509 of which are disposed at the wheels of the rear axle RR, RL in the example shown. Advantageously, the actuators 508, 509 are integrated within the respective brake caliper of the operating brake as an integrated parking brake. The driver can operate the electrical parking brake using an operating switch 510. The parking brake operating switch is at least connected by means of a first signal or data connection 511 to one of the electronic control and regulating units, according to the example to the first electronic control and regulating unit 12, and can optionally (shown in FIG. 2) be connected by means of a second signal or data connection 512 to the other (here the second control and regulating unit 39). Advantageously, the electrical parking brake or the actuators 508, 509 can be actuated or electrically operated by the second electronic control and regulating unit 39, so that a brake boost during braking is possible by means of the parking brake and by means of the second pressure source 248.

The data buses 53, 501, 502 are preferably CAN buses or Flexray buses.

With the exemplary embodiments of FIG. 1 and FIG. 2, according to the example (not shown in detail) the first electronic control unit 112, 12 comprises three redundant computation units. The actuation of the first pressure source 301, 5 is then carried out using a comparison of the output signals of the three redundant computation units, wherein advantageously a majority decision is carried out.

According to the example, the second electronic control unit 139, 39 also comprises three redundant computation units and the actuation of the second pressure source 302, 249 is carried out using a comparison of the output signals of the three redundant computation units, wherein in particular a majority decision is carried out.

According to exemplary embodiments that are not shown, a component at risk of failure or a plurality of components at risk of failure are advantageously triply implemented. A triple implementation of said component(s) would have the advantage that the particularly advantageous triple redundancy can be used.

For example, an erroneous result can be detected by comparison of the computational results of three electronic control units.

According to the example, the brake system may have a third electronic control unit, which can actuate the first and/or the second pressure source.

Advantageously, the third electronic control unit may have a third interface for requesting externally actuated braking.

According to the example, the brake system may have a third electrically controllable pressure source. Said third electrically controllable pressure source can be actuated by the first or the second or the third electronic control unit.

According to the example, the brake system may have a third electrical energy source, which supplies the third electronic control unit and/or the third pressure source.

According to another embodiment, an electrically controllable pressure source, an electronic control unit and a brake operation sensor are at least dual implemented. To further increase the reliability, said components are preferably triple implemented.

As a result of the first electronic control unit comprising a first interface and the second electronic control unit comprising a second interface, the communications with an autopilot or an environment control unit can also be carried out on redundant channels. Therefore, braking without the participation of the driver is guaranteed even if a fault occurs in the brake system.

Preferably, data are received from an environment control unit or sent to the environment control unit via the first interface and data are received from an environment control unit or sent to the environment control unit via the second interface.

According to one embodiment, the first interface is connected to a first interface of an environment control unit by means of a first data bus and the second interface is connected to a second interface of the environment control unit by means of a second data bus, i.e. one that is independent of the first data bus. A reliable connection is thus guaranteed even if one of the data buses is disrupted.

According to an alternative embodiment, the first interface is connected by means of a first data bus to an interface of a first environment control unit and the second interface is connected to an interface of a second environment control unit by means of a second data bus, i.e. one that is independent of the first data bus. A reliable connection is thus guaranteed even if one of the data buses is disrupted.

An environment control unit can also be formed by a group of control units that together or jointly constitute the "autopilot function", i.e. that can request externally actuated braking.

For automated driving, the environment control unit preferably analyzes the signals of radar, lidar and/or ultrasonic sensors as well as advantageously one or more cameras, in order to determine a target movement of the vehicle.

An environment control unit can be implemented as a redundant core microcontroller with two independent interfaces to data buses.

The first and the second brake operation sensors can be implemented as a redundant brake operation sensor and are integrated within a unit. Particularly, the first brake operation sensor is an operation travel sensor or an operation force sensor. Particularly, the second brake operation sensor is an operation travel sensor or an operation force sensor.

Because the interruption of an electrical energy supply is a relatively frequently occurring fault, in order to increase the availability of the autonomous brake function the brake system is supplied from two mutually independent electrical energy sources. For this purpose, the first electronic control unit and the first pressure source are connected to a first electrical energy source and the second electronic control unit and the second pressure source are connected to a second electrical energy source.

The hydraulic control device is divided into a first hydraulic control unit and a second hydraulic control unit, wherein the first pressure source is disposed in the first hydraulic control unit and the second pressure source is disposed in the second hydraulic control unit. Particularly, the at least one first solenoid valve, which is disposed between the wheel brakes and the first pressure source, and the at least one second solenoid valve, which is disposed between the wheel brakes and the second pressure source, are disposed in the first hydraulic control unit.

The brake system may have a third electrically controlled pressure source that is actuated by the first or the second electronic control unit. The brake system may have a third electronic control unit and a third electrically controlled pressure source that is actuated by the third electronic control unit. A third electrical energy source is provided that supplies the third electronic control unit and/or the third pressure source.

The first control unit transmits a confirmation signal by means of the data line (the third data connection) of the second control unit concerning the possibility of a pressure build-up or pressure reduction by means of the first pressure source. In the event that the first pressure source or the actuation thereof is faulty or supplying power to the first pressure source or the hydraulic control device is not possible, it can be detected, using a missing confirmation signal for the second control unit, that pressure application or boosting by means of the second pressure source may be necessary.

At least the electronic control unit is triply implemented or the computation units of at least one of the electronic control units are triply implemented. Owing to the triple redundancy, a comparison of the results can be carried out and thus the actuation of the corresponding pressure source or the pressure sources can be carried out using a majority decision.

One embodiment may have a third electronic control unit, which can actuate the first and/or the second pressure source. Particularly, the third electronic control unit comprises a third interface for requesting externally actuated braking.

As an additional independent possibility for braking or boosting braking, an electrically operated parking brake, which can be electrically controlled by the second electronic control unit may be included. The second pressure source that is actuated by the second electronic control unit can thus be made with smaller dimensions or configured to be less safe, as if need be boosting braking is possible by the second electronic control unit by means of the electrically operated parking brake.

Additionally, the brake system comprises a parking brake operating switch, which is connected to the first electronic control unit by a first signal or data connection and to the second electronic control unit by a second signal or data connection. Thus, even in the event of a failure of one of the electronic control units the vehicle can be parked at the request of the driver.

According to another embodiment of the brake system according to the invention, said brake system comprises a connecting valve per brake circuit as second solenoid valves for the hydraulic connection of the first pressure source to the brake circuit. The connecting valve is in each case particularly disposed in a hydraulic connecting line between the first pressure source and the brake circuit or the brake circuit supply line, and thus enables selective opening or closing of the hydraulic connection between the first pressure source and the brake circuit. Particularly, the connecting valves are implemented as normally closed, so that the brake circuit is hydraulically separated from the first pressure source in a deenergized fallback mode.

According to another embodiment, an isolating valve is included per brake circuit as first solenoid valves. The isolating valve is in each case particularly disposed in a hydraulic connecting line between a brake pedal actuated master brake cylinder and the brake circuit or the brake circuit supply line, and thus enables selective closing or opening of the hydraulic connection between the master brake cylinder and the brake circuit. The isolating valves are particularly implemented as normally open, so that in a fallback mode the brake circuits are hydraulically connected to the master brake cylinder and can thus be subjected to pressure by the driver of the vehicle.

For each brake circuit an output port of the isolating valve and an output port of the connecting valve are hydraulically connected. The hydraulic connection particularly preferably comprises the brake circuit supply line.

The second pressure source is in the form of an electrically controllable pressure providing device that comprises a suction port and a pressure port per brake circuit. In this case, in each brake circuit the pressure port is connected to an input port (i.e. a port facing away from one of the wheel brakes) of the isolating valve associated with the brake circuit. I.e. the second pressure source is disposed upstream of the isolating valves (input side of the isolating valves).

For regulating the pressure provided by the second pressure source, a pressure sensor is provided per brake circuit that detects the pressure at the pressure port of the second pressure source.

The second pressure source and the second electronic control unit for actuation of the second pressure source are disposed in a standalone assembly, an electrohydraulic module. This enables inexpensive manufacture of the brake system optionally with or without a second pressure source. Particularly, the standalone assembly also comprises regulating valves associated with the second pressure source.

A simulator that gives the driver of the vehicle the customary brake pedal feel in the "brake-by-wire" operating mode can also be included. Particularly, the simulator is hydraulically connected to one of the pressure chambers of the master brake cylinder. Particularly, the action of the simulator can be switched on and off by means of a simulator release valve.

An electrically operated, advantageously normally open inlet valve and an electrically operated, advantageously normally closed outlet valve per wheel brake may be for adjusting brake pressures for individual wheels.

The inlet valves and outlet valves are preferably actuated by the first electronic control unit.

The first electronic control unit is designed for actuating the first electrically controllable pressure source to regulate or control the hydraulic pressure output by the same. Furthermore, the at least one first solenoid valve between the wheel brakes and the first pressure source, in particular the isolating valves, and the at least one second solenoid valve between the wheel brakes and the second pressure source, in particular the connecting valves, and possibly a simulator release valve of the brake system are advantageously regulated or controlled by the first electronic control unit.

The second electronic control unit is designed for actuation of the second electrically controllable pressure source for the regulation or control of the hydraulic pressure that is output by the same.

The first electrically controllable pressure source is formed by a cylinder-piston arrangement, the piston of which can be operated by an electromechanical actuator. Such an electrohydraulic actuator operates particularly dynamically, very quietly and withstands the load cycles that are necessary for brake systems without problems.

The second electrically controllable pressure source is implemented as a hydraulic pump with at least two circuits driven by an electric motor. Particularly, regulation of the flow of pressure medium output by the motor-pump unit is carried out by means of regulation of the revolution rate of the motor-pump unit or by means of regulation of the valve flow of an analogue actuated regulating valve connected in parallel with one of the pumps of the motor-pump unit.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A brake system for motor vehicles, which can be actuatable in a "brake-by-wire" operating mode by one of a driver and independently of the driver, comprising:
   a brake pedal;
   at least two hydraulically operated wheel brakes;
   a first and a second brake operation sensor;
   a first electrically controllable pressure source by which the wheel brakes can be operated;
   a first electronic control unit connected to the first brake operation sensor and operable to activate the first pressure source, wherein the first electronic control unit comprises a first interface;
   a second electrically controllable pressure source by which the wheel brakes can be operated;
   a second electronic control unit connected to the second brake operation sensor and operable to activate the second pressure source, wherein the second electronic control unit comprises a second interface;
   a hydraulic control device, which comprises at least one first solenoid valve between the wheel brakes and the first pressure source, and at least one second solenoid valve between the wheel brakes and the second pressure source;
   a data connection between the first electronic control unit and the second electronic control unit, wherein the data connection is a data bus; and wherein the first interface and the second interface are not directly communicatively connected to each other.

2. The brake system of claim 1, wherein data is received from an environment control unit or sent to the environment control unit by the first interface, and wherein data is received from the environmental control unit or sent to the environment control unit by the second interface.

3. The brake system of claim 1, wherein the first interface of the first electronic control unit is connected by a first data connection to a first interface of a first environment control unit, and the second interface of the second electronic control unit is connected by a second data bus to one of a second interface of the first environment control unit and a first interface of a second environment control unit.

4. The brake system of claim 1, wherein the first and the second brake operation sensors are implemented as a redundant brake operation sensor and are integrated within a unit.

5. The brake system of claim 4, wherein the redundant brake operation sensor is an operation travel sensor.

6. The brake system of claim 1, wherein the first electronic control unit and the first pressure source are connected to a first electrical energy source and the second electronic control unit and the second pressure source are connected to a second electrical energy source, wherein the first energy source and the second energy source provide energy mutually independent from one another.

7. The brake system of claim 6, wherein at least one of the first electrical energy source and the second electrical energy source is a battery.

8. The brake system of claim 1, wherein the hydraulic control device is divided into a first hydraulic control unit and a second hydraulic control unit and the first pressure source is disposed in the first hydraulic control unit and the second pressure source is disposed in the second hydraulic control unit.

9. The brake system of claim 8, wherein the at least one first solenoid valve and the at least one second solenoid valve are disposed in the first hydraulic control unit.

10. The brake system of claim 1, wherein said brake system comprises an electrically operated parking brake, which can be controlled by the second electronic control unit.

11. The brake system of claim 10, wherein said brake system comprises a parking brake operating switch, which is connected by a first signal to the first electronic control unit and by a second signal to the second electronic control unit.

12. The brake system of claim 1, wherein the first electronic control unit comprises a first three redundant computation units, and the first pressure source is actuable using a majority decision from a comparison of output signals of the first three redundant computation units.

13. The brake system of claim 1, wherein the second electronic control unit comprises a second three redundant computation units, and the second pressure source is actuable using a majority decision from a comparison of output signals of the second three redundant computation units.

14. The brake system of claim 1, comprising a third electronic control unit with a third interface for requesting externally actuated braking, and wherein the third electronic control unit can actuate at least one of the first and the second pressure source.

15. The brake system of claim 14, comprising a third electrically controllable pressure source, which is actuated by one of the first and the second electronic control unit.

16. The brake system of claim 15, wherein the third electrically controllable pressure source is actuated by the third electronic control unit.

17. The brake system of claim 15, comprising a third electrical energy source, which supplies energy to at least one of the third electronic control unit and the third pressure source.

18. A brake system for motor vehicles, which can be actuatable in a "brake-by-wire" operating mode by one of a driver and independently of the driver, comprising:
   a brake pedal;
   at least two hydraulically operated wheel brakes;
   a first and a second brake operation sensor;
   a first electrically controllable pressure source by which the wheel brakes can be operated;
   a first electronic control unit connected to the first brake operation sensor and operable to activate the first pressure source, wherein the first electronic control unit comprises a first interface;
   a second electrically controllable pressure source by which the wheel brakes can be operated;
   a second electronic control unit connected to the second brake operation sensor and operable to activate the second pressure source, wherein the second electronic control unit comprises a second interface;
   a hydraulic control device, which comprises at least one first solenoid valve between the wheel brakes and the first pressure source, and a second solenoid valve between the wheel brakes and the second pressure source; and
   a data connection between the first electronic control unit and the second electronic control unit wherein the first interface of the first electronic control unit is connected by a first data bus to a first interface of a first environment control unit, and the second interface of the second electronic control unit is connected by a second data bus to one of: a second interface of the first environment control unit and a first interface of a second environment control unit such that the first interface of the first electronic control unit and the second interface of the second electronic control unit are not otherwise communicatively connected to each other.

19. The brake system of claim 8, wherein the first interface, of the first environment control unit or of the second environment control unit, and the second interface, of the first environment control unit, are for requesting externally actuated braking and wherein there are two separate paths for receiving a braking command from an autopilot function.

* * * * *